Sept. 24, 1963
D. M. WADE
3,104,744
ONE WAY ROLLER CLUTCH
Filed Feb. 13, 1961
2 Sheets-Sheet 1
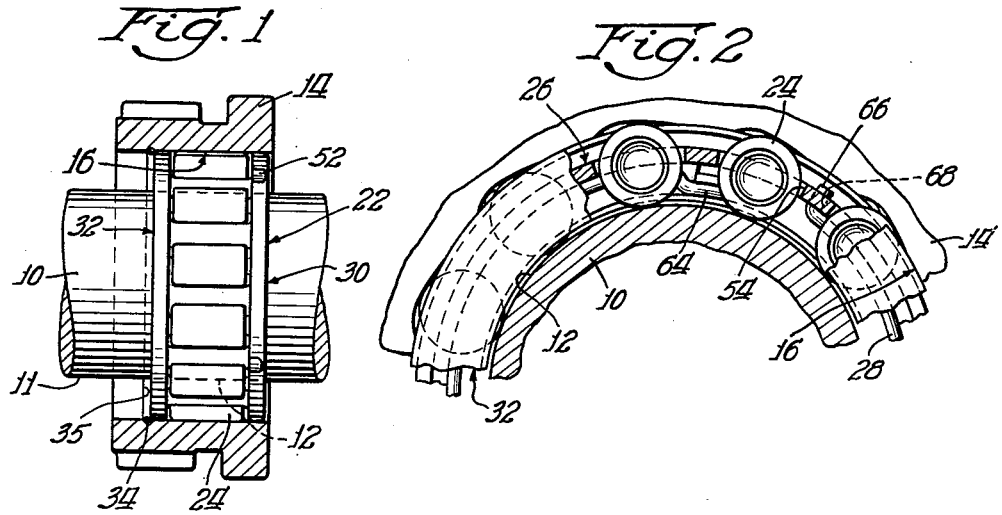
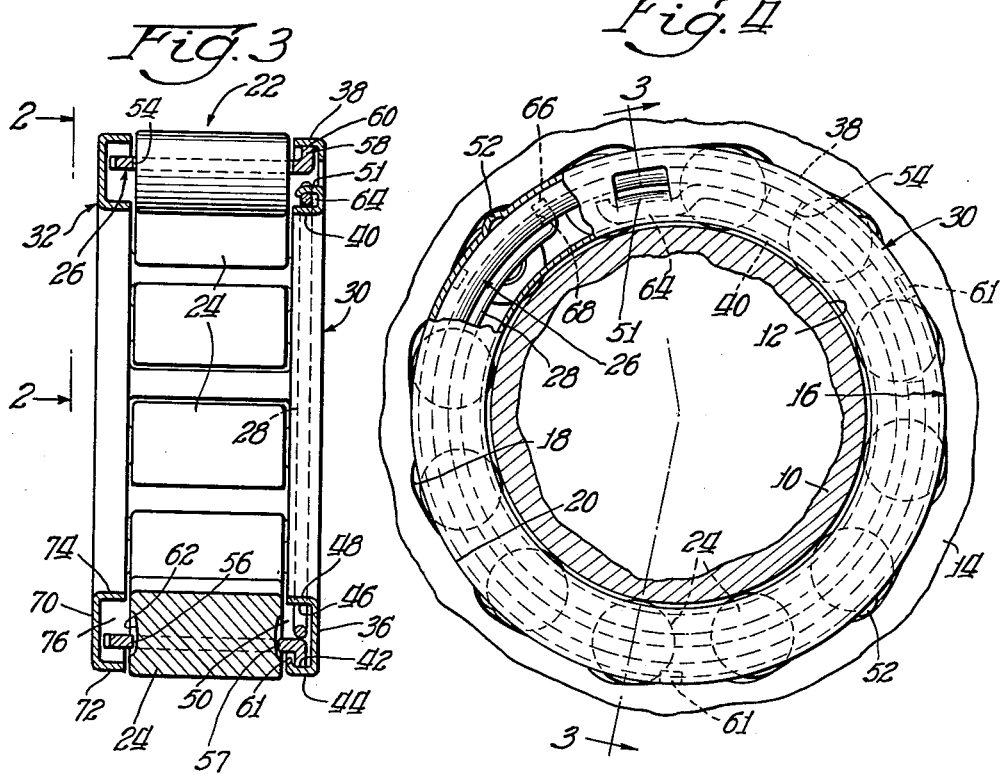
Inventor:
Daniel M. Wade
By: Frank R. Thierjoint Atty.

Sept. 24, 1963 D. M. WADE 3,104,744
ONE WAY ROLLER CLUTCH
Filed Feb. 13, 1961 2 Sheets-Sheet 2
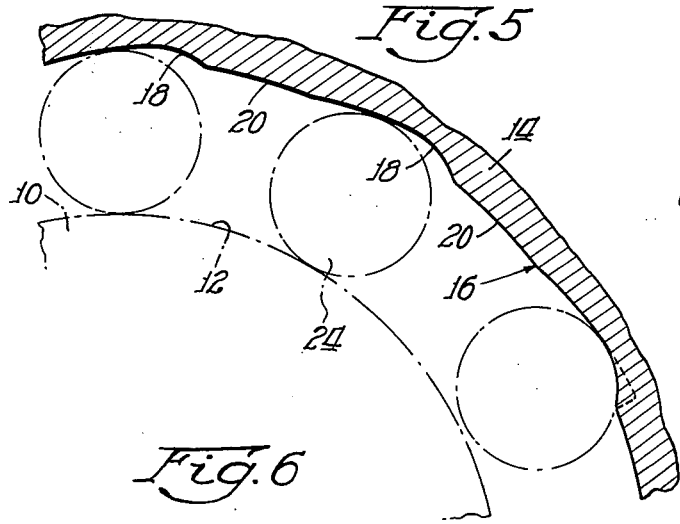
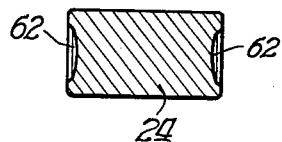
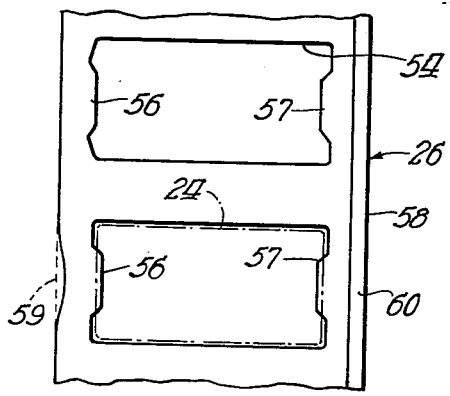
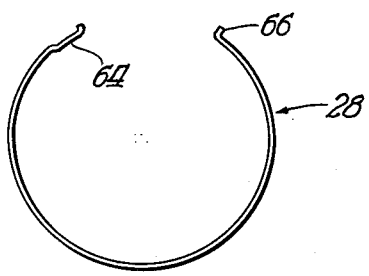
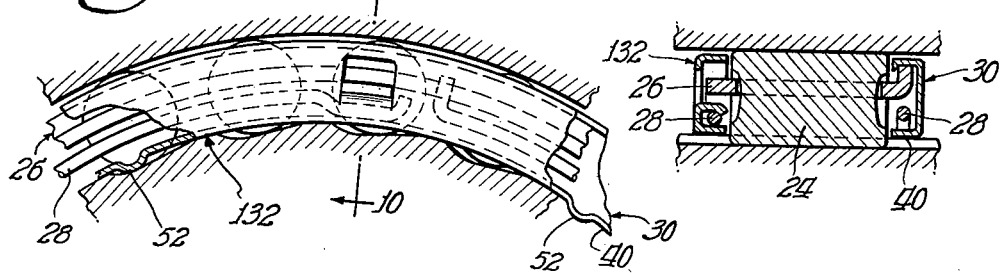
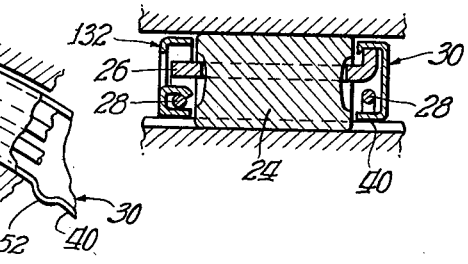
Inventor:
Daniel M. Wade
By: Frank R. Thuenpont Atty.

United States Patent Office 3,104,744
Patented Sept. 24, 1963

3,104,744
ONE WAY ROLLER CLUTCH
Daniel M. Wade, River Forest, Ill., assignor to Borg-Warner Corporation, Chicago, Ill., a corporation of Illinois
Filed Feb. 13, 1961, Ser. No. 88,755
15 Claims. (Cl. 192—45)

This invention relates to one-way clutches and more particularly to a one-way clutch of the roller and cam type to prevent relative rotation between races in one direction while permitting free relative rotation in the opposite direction.

One of the principal objects of this invention is to provide a compact roller clutch unit comprising a roller cage, rollers, energizing spring reaction member and bearing means which houses the energizing spring means. This assembly may be inserted as a unit and removed as a unit from between an inner and outer race.

Another object of this invention is to provide the roller clutch with an end bearing means which serves both as a bearing for centralizing the roller cage with respect to the inner and outer races and also as an enclosure for the energizing spring used to energize the cage and rollers so that the energizing spring is free from any direct connection with either of the races in a complete assembly.

Another object of the invention is to provide a preassembled unit comprising a roller cage, rollers, energizing spring and end bearing means which may be assembled between the inner and outer races with substantially no possibility of making the assembly improperly.

Another object of this invention is to provide a preassembled unit as mentioned above which when in assembled position between the inner and outer races, leaves the spring in an energized condition so as to urge the rollers into engagement with the cammed race.

Another object of the invention is to provide in a preassembled unit a combinataion of elements constructed and arranged so that it is impossible to put excess tension on the energizing spring or to permit the energizing spring or to permit the energizing spring to assume a position in which the spring is not sufficiently energized.

The above and other objects and advantages of the invention will be more readily apparent when read in connection with the accompanying drawings in which:

FIG. 1 illustrates a unitary roller clutch assembly in place between inner and outer races;

FIG. 2 is a partial sectional view taken along the line 2—2 of FIG. 3;

FIG. 3 is a sectional view taken along line 3—3 of FIG. 4 in elevation of the preassembled package unit comprising cage, rollers, end bearing and energizing spring;

FIG. 4 is an end view partially in section of the roller clutch and bearing assembly of FIG. 3;

FIG. 5 is an enlarged partial view of the outer cammed race;

FIG. 6 is an enlarged partial view of the roller cage;

FIG. 7 is an enlarged view of one of the roller elements;

FIG. 8 is a detail view of the energizing spring;

FIG. 9 is a partial view of the clutch device as utilized with an inner cammed race;

FIG. 10 is a partial view in section taken along line 10—10 of FIG. 9 showing a modified form of the invention wherein two energizing springs are used.

Referring now to the drawings wherein like numerals on the different views identify identical parts, the device shown in FIG. 1 comprises a shaft 10 on which there is formed a cylindrical surface 11. A portion of the cylindrical surface 11 serves as an inner race 12. The device further comprises an annular section 14 having formed thereon an internally disposed outer race surface 16. On this outer race 16 are formed a series of cam surfaces 18 (See FIG. 5) separated by a series of cylindrical lands 20 which serve as bearing surfaces. For purposes of the description herein the shaft 10 may sometimes be referred to as the driving member and the portion comprising the annular section 14 as the driven member. It will be appreciated that the function of the two members may be reversed. Disposed between the inner race 12 and the outer race 16 is a preassembled roller clutch unit 22 for preventing relative rotation between the driving and driven members in one direction while permitting the relative rotation in the opposite direction. The roller clutch unit 22 comprises a plurality of rollers 24, a roller cage or retaining member 26, an energizing spring ring 28 and an end bearing reaction member 30.

The roller clutch unit 22 is a preassembled unit which may be conveniently placed between the inner end outer race and may be removed as a unit from between the inner and outer race.

An additional end bearing 32 upon assembly may be positioned between the inner and outer races and up against a snap ring 34 positioned in a groove 35 of the annular section 14. The end bearing 32 in conjunction with the snap ring 34 assists in maintaining the roller clutch unit in alignment.

The end bearing 30, as seen in FIG. 3, is formed into an annular generally U-shaped channel member having radially extending portion 36 and axially extending portions 38 and 40 connected to portion 36. The axially extending flange 38 has formed thereon respectively inner and outer surfaces 42 and 44. The axially extending flange 40 has formed thereon respectively inner and outer surfaces 46 and 48. Portions 36, 38 and 40 thus form a channel-way 50. In an assembled condition, the outer surface 44 of the axially extending flange 38 will be in a bearing relationship with the cylindrical land portions 20 of the outer race 16. The outer surface 48 of the flange 40 will be in bearing contact with the cylindrical surface 11 of the shaft 10.

A small tab 51 is stamped out of and remains connected to the radially extending portion 36 of the end bearing 30. This tab 51 (see FIG. 3) serves to anchor the energizing spring 28 to the end bearing 30. The surface 44 has formed thereon a plurality of projections or nubs 52 for preventing the end bearing from rotating with respect to the outer race as will hereinafter be more fully explained. Various forms of projections could be used. Another example would be an end bearing having formed thereon substantially the configuration of the ramps of the cammed race.

The roller cage or retaining member 26 is a substantially flat axially extending cylindrical piece of material having formed therein a plurality of openings or windows 54 as seen in FIG. 6. Axially extending projections 56 and 57 are formed at each end respectively of each of the windows 54 for loosely retaining the roller elements. At one side of the cage member 26 there is formed a radially outwardly projecting flange portion 58 which is formed substantially at right angles to the axially extending portion of the cage member. The outside surface 60 on the flange portion 58 is maintained in close fitting bearing relationship with the inner surface 42 of the flange 38 of the end bearing 30. Thus the cage member 26 is maintained in a concentric relationship with the end bearing 30 and the inner and outer races. In an assembled condition the end bearing 30 is loosely secured to the cage member, the edge of the flange 38 being crimped as necessary over the edge of the flange portion 58. This crimping is just sufficient to secure the end bearing 30 to the cage member 26 but still permit relative circumferential movement of the two parts with respect to each other. Such crimping is illustrated at 61 in FIG. 3.

Each end of the rollers 24 are formed with indentations or dimples 62 (FIG. 7) to receive the projections 56 and 57 formed in each of the windows of the cage member 26. The relative size of the projections 56 and 57 and the dimples 62 provides a controlled degree of looseness of the roller as desired in order to permit only the desired amount of radial movement of the rollers while at the same time insuring that they are permanently assembled into the cage member 26.

Initially in making the cage 26, the windows 54 are stamped out of the flat cross section of material comprising the cage member leaving projections 56 and 57 extending inwardly at each end of the windows 54. At this stage the distance between the projections 56 and 57 is sufficient to permit a roller 24 to be inserted therebetween. Then with a plurality of rollers 24 properly positioned in the respective cage windows 54, the marginal edge of the cage 26 at positions 59 adjacent the ends of the windows are "clinched" so as to move the marginal metal inwardly from the straight dotted line position to the curved full line position shown in FIG. 6. This causes the projection 56 to move into the corresponding indentation 62 in the roller. The structure then is a permanently assembled cage and roller unit. The degree of "clinching" is so controlled that the rollers are loose and free to rotate within the cage window although permanently secured therein. In a cage member of approximately 2 inches in diameter it has been found, for example, that a good cross sectional thickness for the cage member material is about .055 inch. Thus the projections 56 and 57 offer substantial support for the rollers. The windows 54 are just wide enough to provide clearance for the rollers to pass through, that is, only slightly wider than the diameter of the rollers so that any circumferential movement of the cage in an assembled device is transmitted to all the rollers substantially simultaneously. In other words, in an assembled device the rollers will all move in phase with each other. This is commonly referred to as full phasing and the complete device as herein described would be referred to as a full phased roller clutch.

In the embodiment shown in FIGS. 1–4 the energizing spring 28 of the split ring type when assembled into the roller clutch unit is anchored inside the end bearing 30 by means of the tab 51 at its end 64. The energizing spring 28 is anchored to the cage member 26 at its other end by means of the substantially radially outwardly projecting end 66 received in a hole 68 in the cage member. The ends 64 and 66 of the spring 28 are biased away from each other. In the assembled roller clutch unit the energizing spring lies completely within the end bearing 30. In the unit shown in FIG. 4 the spring ring is actually confined between the inner face of the cage member 26 and the inner surface 46 of the flange 40. The end bearing 32 (see FIG. 3) serves substantially as a closure for the other side of the roller clutch unit. It is similar to the end bearing 30 in that it is formed with a radially extending portion 70 and two portions 72 and 74 extending axially from the portion 70 thus forming a channel way 76 into which the marginal edge of the cage member 26 may extend. It should be noted however, that there is actually no connection between the end bearing 32 and the roller clutch unit except for the fact that the marginal edge of the cage member 26 may touch the inside surface of the radially extending portion 70.

Assembly

Once the snap ring 34 (FIG. 1) has been placed in position in the groove 35 formed on the outer race surface 16, the end bearing 32 is inserted in place against the snap ring. The roller clutch unit 22 may now be put into place and this is done in the following manner. For example, the roller clutch unit 22 may be grasped so that the marginal edge of the cage 26 opposite to that of the end bearing 30 is inserted into the annular section 14 in such a manner that when assembled, the parts will bear a relationship to each other as is shown in FIG. 1. The roller clutch unit is put into place in such a manner that the rollers will each respectively move into the radially outermost portions of the cam surface 18. At that stage of assembly it will be found that the projections or nubs 52 each will strike that portion of the annular section 14 at points roughly in line with cylindrical land surfaces 20 so that the roller clutch unit cannot for the moment be moved any further axially, i.e., completely into position, due to the obstruction offered by the nubs 52. At this stage the end bearing 30 is rotated counterclockwise against the tension of the energizing spring 28 until the nubs 52 are respectively in alignment with the radially outermost portions of a cam surface 18. At that point the roller clutch unit is further moved axially toward the end bearing 32 until the cage member 26 strikes the radially extending portion 70 of the end bearing 32. As the end bearing 30 is rotated in a counterclockwise direction relative to the cage 26 as viewed in FIG. 4 (or clockwise as viewed in FIG. 2), the spring 28 is wound about the inner surface 46 of the radially extending flange 40 on the end bearing 30. The end bearing 30 can be rotated only a limited amount so that overwinding or overtensioning of the spring 28 is prevented since the spring can assume only a minimum diameter, namely, that of the surface 46 of the axially extending flange 40. Thus damage is prevented to the spring by this type of construction. This is a particularly advantageous feature from the standpoint of field servicing. It will be noted that in the assembled position with the energizing spring under tension, the cage 26 is urged in a clockwise direction as viewed in FIG. 2, thus urging the rollers up the ramp of each of the cam surfaces 18. The nubs 52 of the end bearing 30 in cooperation with the cammed portions of the outer race 16 and with the assistance of the energizing spring are effective to maintain the end bearing 30 and the roller cage 26 attached thereto in a substantially secured position with the outer cammed race.

The shaft 10 with its inner race 12 may now be easily inserted into place. As the shaft 10 is put into place and as contact is made with the edge of the rollers, the shaft is twisted slightly in such a direction so that the rollers are given a tendency to expand radially outwardly, that is, move into the radially outermost portions of the cam surfaces 18. If, for example, the shaft is inserted from the right end as viewed in FIG. 1, the shaft would be given a twist in the overrunning direction, thus urging the rollers into their radially outermost position and permitting the shaft to assume the position as shown in FIG. 1. It will be noted that in the final assembly the roller cage has no permanent connection such as by welding, for example, with either of the races.

While the description thus far contemplates a mechanism wherein the outer race is the cammed race, it will be appreciated that a roller clutch unit may also be utilized with an inner cammed race as shown in FIG. 9.

Where an inner cammed race is used the nubs 52 would be formed on the inner axially extending portion 40 of the end bearing 30 to engage complementary portions on the inner cammed race.

In certain applications it may be desirable to use two springs 28 as shown in the modification of FIG. 10. In such case the end bearing 32 of FIG. 3 would be replaced by end bearing 132. End bearing 132 would be of a similar construction to end bearing 30. The spring 28 would be connected to the cage 26 and end bearing 132 in a similar manner to that previously described and as illustrated, for example, in FIGS. 3 and 4. An additional spring may be desirable for example, in the case of a larger unit where more energizing force is needed and where more drag, i.e., free wheeling resistance, is desired between the rollers and the race. The additional spring would also be an added safety factor.

*Operation*

Referring now to the embodiment in FIGS. 1–8, when the inner race 12 is rotated in a clockwise direction as viewed in FIG. 2, the rollers 24 are moved into tight wedging engagement between the two races. This is due in part to the energizing spring 28 which urges the cage member 26 in a clockwise direction. The end bearing 30 serving as a reaction member for the energizing spring 28. Thus the full phased rollers are moved along with the cage in the same direction. Since the rollers are wedged tightly between the two races, rotation of the inner race in a clockwise direction transmits torque to the outer race 16 so that the inner and outer races rotate as a unit. When the inner race 12 is rotated counter-clockwise relative to the outer race 16 as viewed in FIG. 2 the rollers 24 will move away from a wedging engagement with both races, thus permitting the inner race to turn counterclockwise with respect to the outer race and without transmitting any torque to the outer race member. The energizing spring 28, of course, still tends to urge the rollers into wedging engagement but this is counteracted by the movement of the inner race in a counterclockwise direction relative to the outer race.

Thus it will be seen that this invention advantageously provides a roller clutch unit comprising a roller cage, rollers, energizing spring, reaction member and bearing means all in one complete package which may be inserted easily as a unit between an inner and outer race. Furthermore the invention advantageously provides a permanent cage and roller assembly so constructed that the rollers have a controlled degree of looseness to permit a controlled amount of radial movement. Another advantage of this invention lies in the fact that an end bearing means is provided which centers the roller cage with respect to the inner and outer races and at the same time provides a housing for and acts as a reaction member for the energizing spring used to energize the roller cage. This arrangement makes it unnecessary to connect the energizing spring with either of the races. Furthermore, means is provided on the end bearing means for coacting with the cammed race whereby the roller clutch unit may be secured to the cammed race member and assembled between the inner and outer races without any possibility of misassembly.

While a preferred embodiment of the invention has been specifically disclosed, it is understood that the invention is not limited thereto as many variations will be readily apparent to those skilled in the art and the invention is to be given its fullest possible interpretation within the terms of the following claims.

I claim:

1. In a unitary preassembled clutch unit adapted to be inserted between two races the combination comprising: a cage member, a plurality of roller wedging elements mounted in said cage member, a reaction ring member connected to said cage member, said connection comprising an energizing spring means connecting said reaction member and said cage member for energizing said cage member with respect to said reaction member.

2. The device of claim 1 wherein said reaction ring member includes bearing means.

3. In a clutch unit the combination comprising: a cage member, a plurality of roller wedging elements mounted in said cage member, a reaction ring member comprising a substantially U-shaped channel member positioned at one end of said cage member, a split energizing spring ring lying within said reaction member, one end thereof being connected to said reaction member and the other end being connected to said cage member.

4. A combination one-way engaging device and bearing for use with inner and outer races defining a cavity therebetween comprising: a plurality of roller wedging elements, cage means having apertures through which said wedging elements extend, an end bearing reaction member generally U-shaped in cross-section including means disposed between said cage means and the races effective to engage and space the races, and biasing means mounted completely within said end bearing reaction member and connected to said bearing reaction member and said cage means.

5. In a roller clutch unit adapted to be disposed between two relatively rotatable members so as to permit relative rotation between the two members in one direction but prevent relative rotation beween the members in the other direction the combination comprising: a cage member, a radially extending flange formed on one end of said cage member, means defining a plurality of openings in said cage member for receiving roller elements, a plurality of roller elements mounted in the openings of said cage member, end bearing means comprising a substantially U-shaped channel member connected to said cage member and disposed around said radially extending flange, said end bearing means being adapted to assume a bearing relationship with respect to at least one of the two relatively rotatable members, a split energizing spring ring for energizing said cage member lying within said end bearing means, one end of said energizing spring being connected to said cage member and the other end thereof being connected to said end bearing means, said energizing spring also being confined between a portion of said cage member and a portion of said end bearing means whereby said confinement is effective to preload said energizing spring a predetermined amount and is also effective to prevent over-tensioning of said energizing spring.

6. In a one-way engaging device of the type having one cammed race the combination comprising: cage means having a plurality of windows therein, said windows being adapted to receiving wedging elements, a plurality of wedging elements respectively positioned in each of said windows, a generally U-shaped end bearing connected to said cage means, the open portion of said U-shaped end bearing facing axially, energizing spring means lying substantially within said U-shaped end bearing, means connecting one end of said spring means to said end bearing, means connecting the other end of said spring means to said cage means, said cage means, spring means and end bearing being so positioned with respect to each other that said end bearing may be rotated with respect to said cage means through only a limited degree of circumferential movement, and means on said end bearing for coacting with the cammed race to lock said end bearing with respect to said cammed race.

7. A one-way engaging device comprising concentric, rotatable driving and driven members having radially spaced driving surfaces, one of which is a shaped cam surface, a cage interposed between said members, circumferentially spaced roller elements carried by said cage between said surfaces, a generally U-shaped end bearing connected to said cage, the open portion of said U-shaped end bearing facing axially toward said cage, a split energizing spring ring lying substantially within said U-shaped end bearing for resiliently urging said cage in one rotative direction to wedge said roller elements between said members, means connecting one end of said spring to said end bearing, means connecting the other end of said spring to said cage, said cage, spring and end bearing being so positioned with respect to each other that said end bearing may be arcuately moved with respect to said cage through only a limited degree of circumferential movement to thereby prevent over-tensioning said spring means.

8. The device of claim 7 including means on said end bearing for coacting with said cam surface to position said end bearing, cage, and rollers with respect to said cam surface to effect an urging of said rollers into engagement with said cam surfaces.

9. In a one-way engaging device a preassembled clutch unit comprising an annular generally U-shaped channel member defining inner and outer axially extending flanges and a radially extending portion connecting said inner and outer flanges and adapted to be disposed between two concentric rotatably disposed driving and driven members of a one-way engaging device, wherein one of the members would have a cammed surface formed thereon, a cylindrical axially extending cage member of such dimension as to extend into said annular U-shaped channel member and having a plurality of circumferentially spaced openings formed therein, a plurality of rollers disposed in said openings, an energizing spring connected to said cage member and said annular channel member for energizing said cage member and disposed between one of the flanges of said channel member and the cage member.

10. The device of claim 9 including means on said annular channel member for positioning said preassembled unit in relation to said cam surface.

11. The device of claim 9 wherein the cage member includes axially projecting means extending inwardly from each end of each of said openings, said means projecting respectively into indentations formed on the ends of each of said rollers and said projections and indentations together providing a controlled degree of looseness to restrict the radial displacement of the roller elements.

12. A cage and roller assembly comprising a cage member, means defining a plurality of openings in said cage member for receiving roller elements, a plurality of roller elements, means on each of said roller elements defining indentations in the ends of said roller elements, and means on said cage member defining projections extending into each of said opening defining means and into the indentations in the ends of each of said rollers.

13. A unitary preassembled clutch unit adapted to be inserted between two races said unit comprising: a cage member, a plurality of wedging elements mounted in said cage member, a pair of reaction members disposed at each end of said cage member, and energizing spring means connecting each of said reaction members to said cage member for energizing said cage member with respect to said reaction member.

14. A unitary preassembled clutch unit adapted to be inserted between two races said unit comprising: a cage member having openings formed therein, a plurality of roller wedging elements supported in the openings in said cage member, a pair of reaction members disposed at each end of said cage member, energizing spring means connecting each of said reaction members to said cage member for energizing said cage member with respect to said reaction member, and bearing means formed on each of said reaction members.

15. In a unitary pre-assembled clutch unit adapted to be inserted between two races said unit comprising: a cage member, a plurality of roller wedging elements mounted in said cage member, cooperative means on said cage member and said roller wedging elements for holding said cage member and roller wedging elements in assembled relation, a reaction ring member connected to said cage member, energizing spring means connecting said reaction member and said cage member for energizing said cage member with respect to said reaction member.

References Cited in the file of this patent
UNITED STATES PATENTS

| | | |
|---|---|---|
| 2,204,768 | Peck | June 18, 1940 |
| 2,705,552 | Cross et al. | Apr. 5, 1955 |
| 2,886,153 | Cobb | May 12, 1959 |
| 2,912,086 | Troendly et al. | Nov. 10, 1959 |
| 3,011,606 | Ferris et al. | Dec. 5, 1961 |